US011832003B2

(12) United States Patent
McGrath

(10) Patent No.: US 11,832,003 B2
(45) Date of Patent: Nov. 28, 2023

(54) BINNABLE TIME-OF-FLIGHT PIXEL

(71) Applicant: Shenzhen Goodix Technology Co., Ltd., Shenzhen (CN)

(72) Inventor: Robert Daniel McGrath, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/712,171

(22) Filed: Apr. 3, 2022

(65) Prior Publication Data

US 2023/0319432 A1    Oct. 5, 2023

(51) Int. Cl.
| | |
|---|---|
| H04N 25/59 | (2023.01) |
| H04N 25/75 | (2023.01) |
| H04N 25/76 | (2023.01) |
| H04N 25/702 | (2023.01) |
| H04N 25/46 | (2023.01) |
| H04N 25/705 | (2023.01) |
| H04N 23/667 | (2023.01) |
| H04N 25/701 | (2023.01) |

(52) U.S. Cl.
CPC ........... *H04N 25/59* (2023.01); *H04N 23/667* (2023.01); *H04N 25/46* (2023.01); *H04N 25/702* (2023.01); *H04N 25/705* (2023.01); *H04N 25/75* (2023.01); *H04N 25/76* (2023.01); *H04N 25/701* (2023.01)

(58) Field of Classification Search
CPC ...... H04N 25/59; H04N 23/667; H04N 25/46; H04N 25/702; H04N 25/705; H04N 25/75; H04N 25/76; H04N 25/701; H04N 25/703; H04N 25/40; H04N 25/771
See application file for complete search history.

(56) References Cited

U.S. PATENT DOCUMENTS

| | | | |
|---|---|---|---|
| 10,784,294 B2 * | 9/2020 | Jin | ..................... H01L 27/14605 |
| 11,108,957 B1 * | 8/2021 | Oh | ......................... H04N 25/771 |
| 2011/0025893 A1 * | 2/2011 | Kim | ......................... H04N 25/76 348/294 |
| 2019/0339392 A1 * | 11/2019 | Manabe | ............ H01L 27/14643 |
| 2021/0360177 A1 * | 11/2021 | Oh | ......................... H04N 25/75 |
| 2022/0021831 A1 * | 1/2022 | Jin | ........................... G01S 7/493 |

\* cited by examiner

*Primary Examiner* — Albert H Cutler
(74) *Attorney, Agent, or Firm* — KILPATRICK TOWNSEND & STOCKTON LLP

(57) ABSTRACT

Binnable time-of-flight (ToF) pixels are described, such as for integration with image sensor pixels. Each binnable ToF pixel includes a central dump gate and sub-pixels that are nominally mirror-symmetric and identical around the dump gate. Each sub-pixel includes a photodiode region (or a respective portion of a photodiode region), a storage gate, a storage region, a transfer gate, and a floating diffusion (FD) region. In an array, the binnable ToF pixels are arranged to share FD regions with other binnable ToF pixels of the array. In an un-binned mode, each sub-pixel can integrate photocharge in its storage region until it is time for readout, at which time the photocharges can be transferred to its respective floating diffusion region for individualized readout. In a binned mode, sub-pixels can integrate photocharge directly in their FD regions, which facilitates charge binning of integrated photocharge from all sub-pixels sharing the same FD region.

18 Claims, 8 Drawing Sheets

BINNABLE TIME-OF-FLIGHT PIXEL

FIELD

The present invention relates generally to complementary metal-oxide semiconductor (CMOS) image sensors. More particularly, embodiments relate to binnable architectures and arrangements of time-of-flight (ToF) pixels for integration with CMOS image sensor (CIS) applications.

BACKGROUND

Many modern electronics applications include integrated digital cameras and/or other digital imaging systems, which are based on complementary metal-oxide semiconductor (CMOS) image sensor (CIS) technologies. A digital imaging system is typically implemented by one or more arrays of pixels, each including one or more photo-sensors (e.g., photodiodes), or a grouping of multiple photo-sensors. Each pixel or group of pixels can also include supporting hardware, such as source-follower, select, and reset transistors for converting the optical responses of the photo-sensors into corresponding electrical signals for use by other components.

Some digital imaging applications include depth sensing features, such as for assisting with autofocus and/or three-dimensional imaging. Depth sensing can be performed in various ways, including using time-of-flight (ToF) techniques. Typically, an illuminator, such as an infrared illumination, a Vertical Cavity Surface Emitting Laser (VC-SEL), or the like, outputs light pulses. The illumination bounces off of a scene object and reflects back to ToF photo-sensors, such that some roundtrip time elapses between outputting the illumination and detecting the reflection. The roundtrip time is a function of distances and geometric relationships between the image sensor components and the scene object. As such, a relative time shift between outputting the illumination and detecting its reflection can indicate a roundtrip distance traveled by the illumination, which can be used to compute a distance (depth) measurement between the imaging system and the scene object.

Some modern ToF approaches use a so-called ToF photodiode. Such ToF photodiodes typically switch rapidly and periodically between activating each of multiple output taps. Received photons are converted into photocarriers (i.e., electrons or holes), which are directed to whichever output tap is active at the time. Rather than collecting charge in the photodiode itself, charge is collected at each output tap as photocarriers are selectively directed to the output taps. The relative difference in charge collected at the different output taps can change based on a distance of the scene object from the imaging system. In an ideal ToF photodiode, in which photocarriers entering the device are immediately collected at a presently active output tap with zero delay, an accurate correlation can be computed between the relative charge collected at each output tap and a detected distance of a scene object. However, the accuracy of such a correlation tends to be limited in conventional ToF photocarriers by device non-idealities and sub-optimal design.

BRIEF SUMMARY

Embodiments provide circuits, devices, and methods for implementing binnable time-of-flight (ToF) pixels for integration with digital imaging systems. Each binnable ToF pixel includes a central dump gate and first and second sub-pixels that are nominally mirror-symmetric and identical around the dump gate. Each sub-pixel includes a photodiode region (or a respective portion of a photodiode region), a storage gate, a storage region, a transfer gate, and a floating diffusion (FD) region. In an array, the binnable ToF pixels are arranged to share FD regions with other binnable ToF pixels of the array. In an un-binned mode, each sub-pixel can integrate photocharge in its storage region until it is time for readout, at which time the photocharges can be transferred to its respective floating diffusion region for individualized readout. In a binned mode, sub-pixels can integrate photocharge directly in their FD regions, which facilitates charge binning of integrated photocharge from all sub-pixels sharing the same FD region.

BRIEF DESCRIPTION OF THE DRAWINGS

The accompanying drawings, referred to herein and constituting a part hereof, illustrate embodiments of the disclosure. The drawings together with the description serve to explain the principles of the invention.

The patent or application file contains at least one drawing executed in color. Copies of this patent or patent application publication with color drawing(s) will be provided by the Office upon request and payment of the necessary fee.

Figure 1:
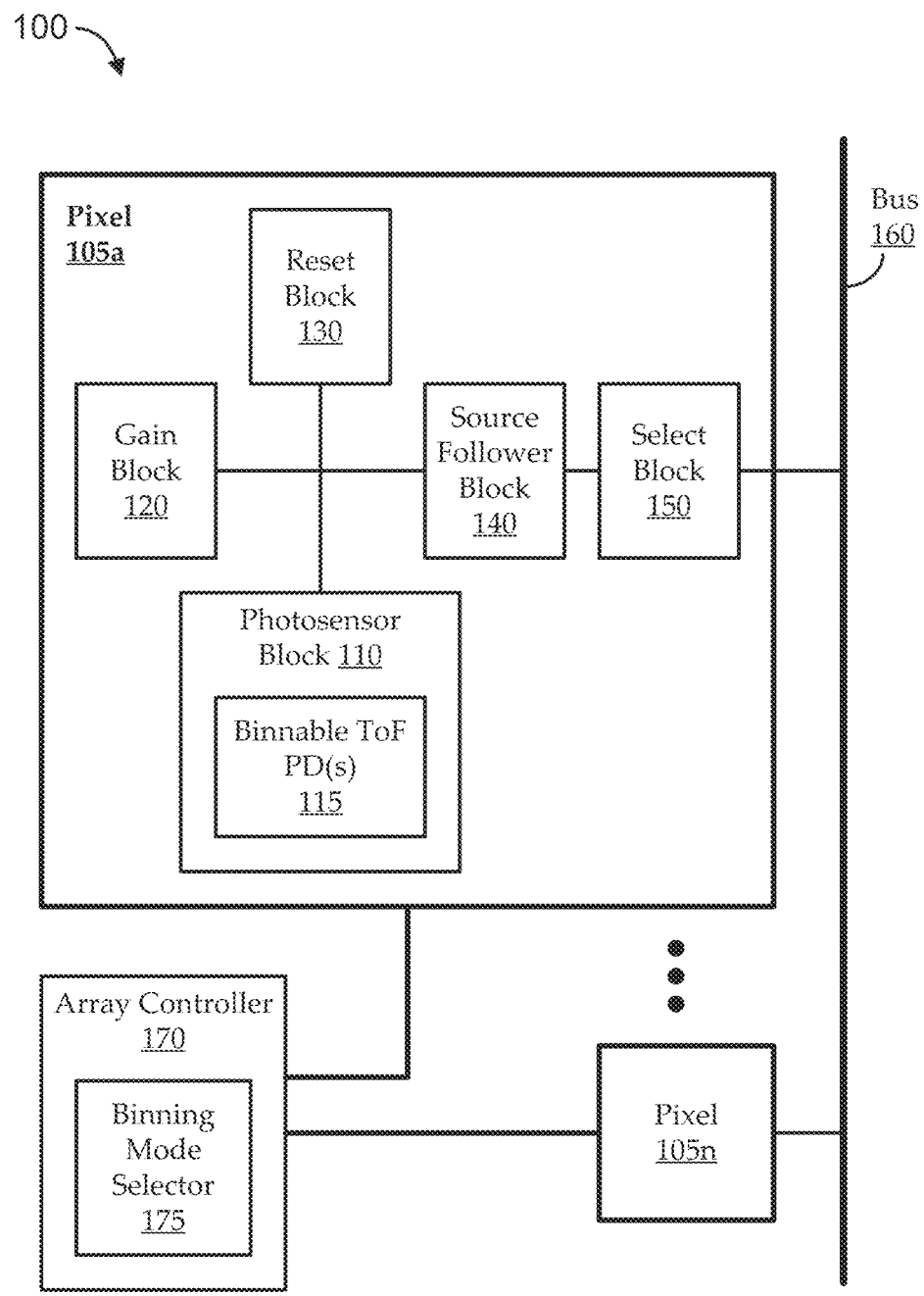
FIG. 1 shows a simplified block diagram of a portion of an illustrative digital imaging system, as context for various embodiments described herein.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are provided for a thorough understanding of the present invention. However, it should be appreciated by those of skill in the art that the present invention may be realized without one or more of these details. In other examples, features and techniques known in the art will not be described for purposes of brevity.

Some modern digital imaging systems use ToF pixels to obtain distance-related information for use with auto-focusing features, three-dimensional imaging features, and/or the like. ToF pixels generally modulate transfer of photocharge to multiple taps synchronously with modulation of an illumination source, so that the accumulated photocharge at the multiple readout taps corresponds to round-trip timing of reflected illumination from the modulated illumination source. As digital imaging systems have continued to become smaller, and resolutions of such systems have continued to increase, there has been a continued drive to decrease the size of its sensor pixels, including its ToF pixels. However, shrinking pixel sizes can also impact performance, such as by limiting the dynamic range of the pixels across different lighting conditions.

For typical imaging pixels (i.e., non-ToF pixels), a number of different techniques are used to increase dynamic range and/or other performance characteristics. For example, "pixel binning" can be used to bin together information from multiple non-ToF pixels to improve low-illumination performance (e.g., and to selectively not bin together pixels in high-illumination conditions). However, conventional ToF pixels do not support pixel binning. For example, non-ToF pixels typically accumulate photocharge within a photodiode for some time, then transfer the accumulated photocharge to a floating diffusion node for readout. By connecting multiple non-ToF pixels to a common floating diffusion node, the charges from the multiple non-ToF pixels can either be transferred individually to the floating diffusion node and read out individually, or transferred concurrently to the floating diffusion node and combined ("charge-binned") for a single readout. However, as noted above, ToF pixels do not accumulate charge within a photodiode; rather, they continually shuttle photocharges to multiple floating diffusion nodes at multiple readout taps. Because the photocharges are accumulated directly at the floating diffusion nodes, conventional ToF pixels are incompatible with conventional charge binning approaches.

Embodiments described herein include novel designs and arrangements of ToF pixels that support charge binning. Embodiments include a novel binned ToF architecture having a dump tap positioned in the center of the binnable ToF pixel with a photodiode region at least on either of two sides of the central dump tap. A substantially symmetric and linear arrangement extends from each of the two sides of the central dump tap, each arrangement having a respective storage gate, respective storage node, respective transfer gate, and respective floating diffusion node. Each floating diffusion node includes a readout tap corresponding to one of two readout taps of the binnable ToF pixel. A binning arrangement can be produced by arranging multiple such binnable ToF pixels in patterns (e.g., 2-by-2 pattern) in which groups of binnable ToF pixels share floating diffusion nodes.

For example, in an un-binned mode (i.e., in which each binnable ToF pixel is separately read out), as photons are converted to photocarriers in the photodiode region, each storage gate can be alternately actuated to shuttle the photocarriers to the storage nodes for accumulation until it is time for readout of that binnable ToF pixel. At the readout time, the transfer gates can be used to shuttle accumulated photocarriers from the storage nodes to the floating diffusion nodes for readout. In a binned mode (i.e., in which multiple binnable ToF pixels are to be read out together), as photons are converted to photocarriers in the photodiode region, the storage gate and transfer gate at each side of the central dump gate can be alternately actuated together to shuttle the photocarriers directly to the floating diffusion nodes for accumulation until it is time for readout of that binned group of binnable ToF pixels. With such a binned readout of the binnable ToF pixels, generation of distance information can involve interlaced processing of the binned ToF output signals.

FIG. 1 shows a simplified block diagram of a portion of an illustrative digital imaging system 100, as context for various embodiments described herein. The digital imaging system 100 can be built around a complementary metal-oxide semiconductor (CMOS) image sensor (CIS) technology. Such a CIS system can typically include one or more arrays of pixels 105, such as a large number of pixels 105 arranged in rows and columns. Each pixel 105 can include a photo-sensor block 110, which can include a single photodiode 115 (e.g., or any suitable photo sensor), or a grouping of multiple photodiodes 115. Each photo-sensor block 110 of the digital imaging system 100 illustrated in FIG. 1 includes one or more binnable time-of-flight (ToF) photodiodes (PDs) 115, as described herein.

The pixel 105 also includes additional components to facilitate usage of the photo-sensor block 110 for optical sensing. As illustrated, embodiments can include a gain block 120, a reset block 130, a source-follower block 140, and a select block 150. The gain block 120 can control gain for the pixel 105, such as by implementing dual conversion gain (DCG). The reset block 130 can selectively reset the pixel 105 components. The source-follower block 140 can support conversion of outputs from the photo-sensor block 110 into an electrical signal indicative of optical information detected by the photo-sensor block 110. The select block 150 can support selection of the pixel 105 signals from among the array of pixels 105, for example responsive to a control signal received via a bus 160. For example, the bus 160 may be a column select bus, or the like.

As illustrated, the pixels 105 can be in communication with an array controller 170. The array controller can generate control signals to control components of the pixels 105. In some implementations, the array controller 170 controls readout by directing actuation states of the gain block 120, a reset block 130, a source-follower block 140, and the select block 150 (e.g. controlling transistor gates, or the like). As described more fully herein, implementations of the array controller 170 also control actuation states of various gates of the binnable ToF PDs 115. In some implementations, the array controller 170 includes a binning mode selector 175 that can be set to one of a binned mode or an un-binned mode. As described herein, the array controller 170 can control actuation states of various gates of the binnable ToF PDs 115 to facilitate binned or un-binned operation in accordance with the binning mode set by the binning mode selector 175.

Figure 2:
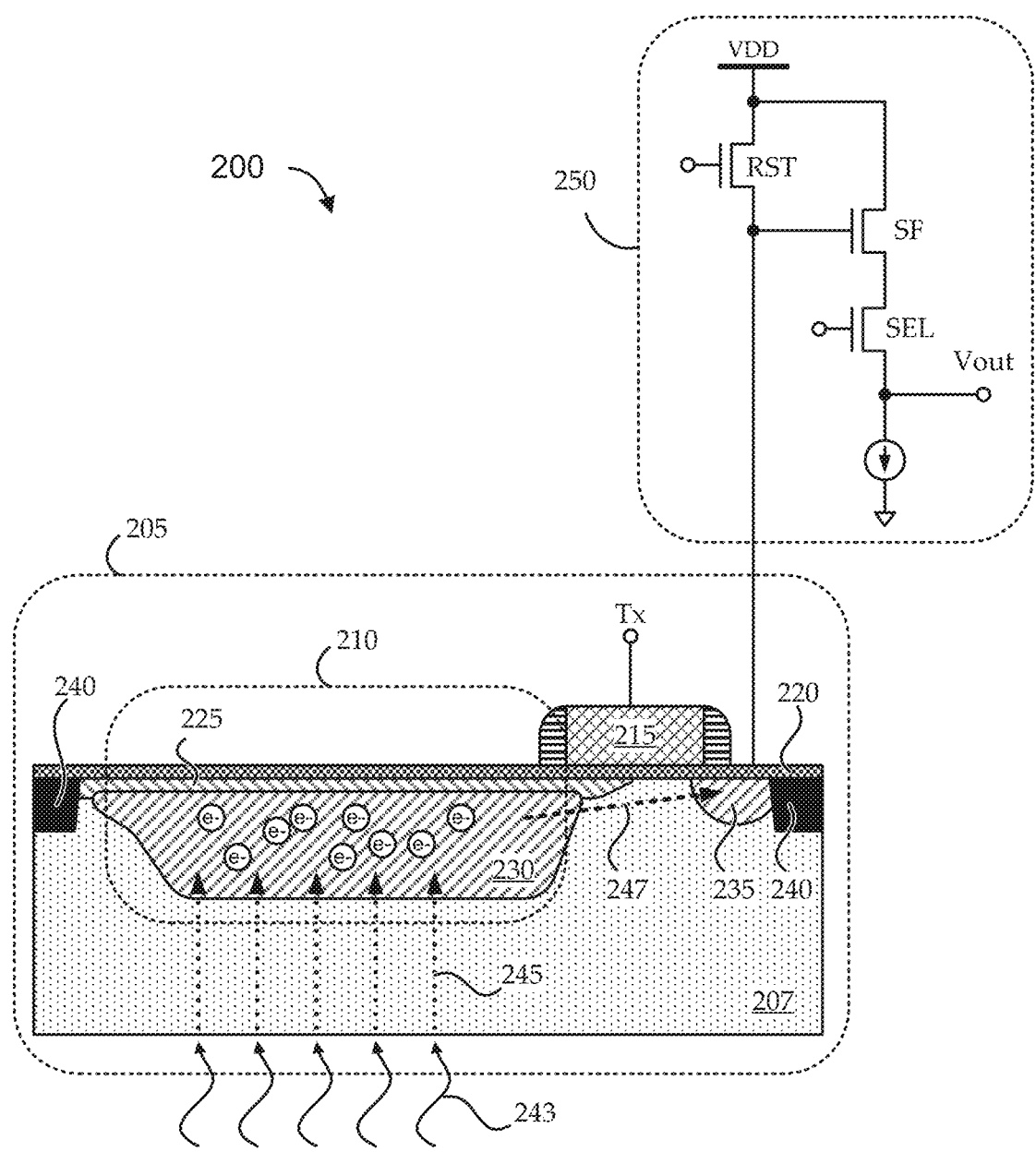
FIG. 2 shows an example of a conventional CIS pixel implementation that includes a conventional pinned photodiode (PPD) configured for backside illumination.

In a conventional (i.e., not ToF) photodiode, the photodiode is exposed to illumination, and charge is collected in the device based on the amount of illumination (e.g., number of photons received at the device during the exposure time). For the sake of illustration, FIG. 2 shows an example of a conventional CIS pixel implementation 200 that includes a conventional pinned photodiode (PPD) 210 configured for backside illumination. The pixel implementation 200 includes a photosensor block 205 (that can be considered as including the conventional PPD 210 itself) and a readout structure 250 having a reset transistor (RST), a source follower transistor (SF), and a select transistor (SEL). As noted above, the conventional PPD 210 is illustrated as configured for backside illumination; a similar conventional PPD 210 implementation can be used for front-side illumination configurations.

The photosensor block 205 includes a transfer gate 215 that can be activated by a Tx signal and can be isolated from a substrate 207 by an oxide layer 220. The substrate 207 can be a silicon wafer, or the like, having a first doping type (e.g., P-type). On one side of the transfer gate 215, the conventional PPD 210 can be formed by implanting into the substrate 207 a shallow first-doping-type (e.g., P-type) pinning region 225 and a deeper second-doping-type (e.g., N-type) collection region 230. On the opposite side of the transfer gate 215, a floating diffusion region 235 can be formed by implanting another second-doping-type (e.g., N-type) well into the substrate 207. Isolation regions 240 (e.g., shallow-trench isolation, STI) can be formed to electrically isolate structures of the photosensor block 205 from those of adjacent photosensor blocks and/or pixels.

As photons reach the backside of the substrate 207 (e.g., illustrated by arrows 243), they can be converted into photocarriers (i.e., electrons and holes), one of which being attracted to and collected in the collection region 230 (e.g., illustrated by dotted arrows 245). The accumulation of photocarriers in the collection region 230 can be considered generally as an accumulation of charge. For example, longer and/or brighter exposure can result in a greater accumulation of charge in the collection region 230. Activating the Tx signal can form a depletion region below the transfer gate 215, which effectively becomes a current channel between the two second-doping-type (e.g., N-type) regions: the collection region 230 and the floating diffusion region 235. As such, activation of the transfer gate 215 causes accumulated charge in the collection region 230 to transfer across the current channel to the floating diffusion region 235.

The charge transferred to the floating diffusion region 235 can be read out by the readout structure 250. For example, a gate voltage can be generated based on the charge at the floating diffusion region 235, which can drive a gate of SF (previously reset by actuating RST). As illustrated, SEL is coupled between a source terminal of SF and an output voltage terminal (Vout), and a constant current source is coupled between Vout and ground. As such, when the select transistor is activated (e.g., as part of a row select operation), an output voltage is generated at Vout based on the gate voltage.

It can be seen that in a typical CIS implementation of a conventional (non-ToF) PPD 210, the pixel output signal (e.g., as indicated by the output voltage level at Vout) is effectively related to the amount of charge accumulated in the conventional PPD 210 over an exposure time. In this way, an array of such CIS pixels can be used to measure amounts of light (e.g., of particular colors, etc.) being received from different locations in a scene, thereby facilitating forming an image of the scene. Embodiments described herein relate to ToF photodiodes. Rather than facilitating imaging of a scene, ToF photodiodes seek to use optical return time to measure distances between the image sensor and locations in the scene. Unlike non-ToF photodiodes, such as the conventional PPD 210, ToF photodiodes typically are not designed to accumulate charge within the photodiode. Instead, at any given time, ToF photodiodes seek rapidly to shuttle photocarriers out of the photodiode via a presently selected one of multiple output taps into a corresponding one of multiple accumulation nodes. Relative accumulations of charge in the different accumulation nodes can be used to compute distance measurements.

Figure 3:
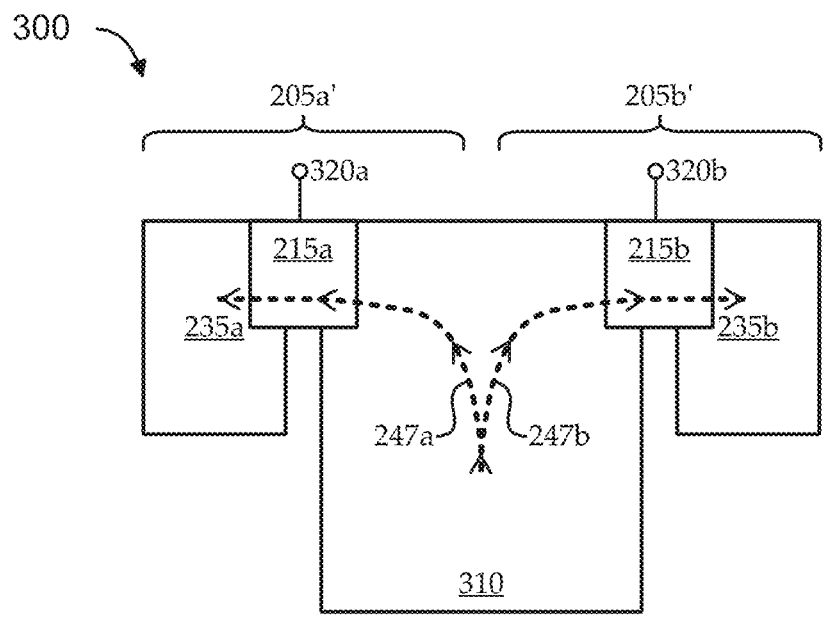
FIG. 3 shows a simplified planar view of a conventional for time-of-flight (ToF) photodiode block.

For added context, FIG. 3 shows a simplified planar view of a conventional ToF photodiode block 300. The conventional ToF photodiode block 300 includes a photodiode region 310, two transfer gates 215, and two floating diffusion regions 235. Such a ToF photodiode block is sometimes referred to by those of skill in the art as a "ToF photodiode," a "ToF pixel," a "ToF sensor," or the like. The term "ToF photodiode block" is used herein to clearly reference the entire block, including the detection portion (i.e., the photodiode region 310) and the transfer portion (i.e., the transfer gates 215 and floating diffusion regions 235); as opposed to only the photodiode region 310 of the block, or the pixel in which the ToF photodiode block is incorporated (which may include multiple ToF photodiode blocks, readout structure components, etc.). The photodiode region 310 can be implemented in any suitable manner. In some implementations, the photodiode region 310 is implemented as a pinned photodiode (PPD). For example, the conventional ToF photodiode block 300 can be implemented effectively as two mirror-image instances of the non-ToF photosensor block 205 of FIG. 2 (indicated generally as regions 205a' and 205b') that share the conventional PPD 210 portion. As such, the photodiode region 310 includes a pinning region (e.g., configured for backside illumination). Each transfer gate 215 (i.e., the transfer gate 215 corresponding to each instance of the photosensor block in its respective region 205') is disposed between the photodiode region 310 and a respective one of the floating diffusion regions 235.

Each transfer gate 215 is selectively activated by a respective activation signal 320, such that only one of the transfer gates 215 is active at any time. Switching between the transfer gates 215 can occur very rapidly and periodically and can be synchronous with modulation of an illumination source. At any given time, activating one of the transfer gates 215 forms a depletion region below that transfer gate 215, which can provide a current channel between the photodiode region 310 and the one of the floating diffusion regions 235 associated with the activated transfer gate 215. As described above, as photons hit the backside of the photodiode region 310 (with sufficient energy), they are converted into photocarriers (i.e., electrons or holes). Rather than accumulating in a collection region within the photodiode region 310 (e.g., as in the conventional PPD 210 of FIG. 2), as photocarriers are generated in the photodiode region 310, they are shuttled into the currently active floating diffusion region 235 via the channel formed below the currently active transfer gate 215 (as illustrated by dotted arrows 247).

Figure 4:
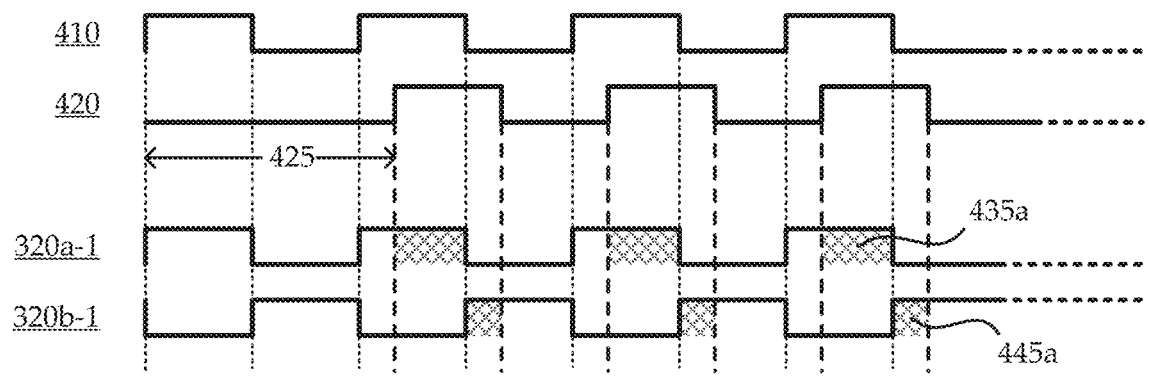
FIG. 4 shows illustrative waveforms to further clarify operation of a ToF photodiode block, such as the conventional ToF photodiode block of FIG. 3.

As described more fully below, the two depletion regions can be coupled with readout taps, such that the ToF photodiode block 300 has two readout taps that are nominally equivalent (i.e., as equivalent as practical within design constraints, etc.). Though not shown, the ToF photodiode block 300 can include another tap (referred to herein as a "dump" tap) to drain all accumulated charge between integration times. By alternatively shuttling photocharge between the two floating diffusion regions 235 via the two transfer gates 215, photocharge is integrated in the two floating diffusion regions 235 and can be read out via the two readout taps. As illustrated by FIG. 4, comparing the amounts of accumulated charge at the two readout taps can yield ToF-based distance information.

FIG. 4 shows illustrative waveforms to further clarify operation of a ToF photodiode block, such as the conventional ToF photodiode block 300 of FIG. 3. As described above, ToF photodiode blocks are used to measure distance. For example, a CMOS imaging system includes an illumination source and an array of ToF photodiodes. The illumination source can include one or more infrared sources, VSCELs, or other suitable components for producing an illumination signal. Typically, the illumination signal is modulated in a defined manner. For example, the illumination signal is a series of pulses, such that the amplitude of the illumination signal is substantially a square wave, a pulse-width-modulated (PWM) signal, etc. An example waveform for such an illumination signal, as projected, is illustrated as waveform 410.

The illumination signal is projected into a scene, after which it reflects off of, or otherwise optically interacts with surfaces, objects, etc. at one or more distances from the imaging system. A portion of the reflected illumination signal is received back at the imaging system by the array of ToF photodiode blocks. Each photon of the illumination signal takes some amount of time (a roundtrip time) to travel from the illumination source, to some surface in the scene, and back to the array of ToF photodiode blocks. The roundtrip time manifests as a phase shift between the projected illumination and the received reflected illumination. Waveform 420 represents the illumination signal as detected after reflecting off of a scene surface some distance away. An illustrative phase shift 425 can be seen between the start of the projected illumination signal waveform 410 and the start of the detected reflection waveform 420.

The ToF photodiode blocks can be configured to alternate between transfer gates 215 at a rate corresponding to the modulation frequency of the illumination signal. For example, if the illumination signal is modulated as a 50 Megahertz square wave, the ToF photodiode blocks can be configured to alternate between transfer gates 215 every 10 nanoseconds (e.g., where there are two transfer gates 215). Such switching can be accomplished by configuring activation signals 320 to be complementary 50 Megahertz square waves.

Illustrative waveforms for the activations signals 320 are represented in FIG. 4. It is assumed in the convention of FIG. 4 that floating diffusion region 235a is active when activation signal 320a is HIGH, and floating diffusion region 235b is active when activation signal 320b is HIGH. As illustrated, the complementary activation signals 320 can begin synchronously with projecting the illumination signal. After some time delay, photons from the reflected illumination begin to reach the ToF photodiode blocks. Those photons produce corresponding photocarriers in the photodiode region 310, and those photocarriers are shuttled into whichever floating diffusion region 235 is active. A total elapsed time (e.g., delay) between when a photon reaches the backside of the photodiode region 310 and when the correspondingly generated photocarrier is shuttled out to a presently active floating diffusion region 235 for accumulation is referred to herein as "shuttle time."

Waveforms 320a-1 and 320b-1 represent the activation signals 320 in a first illustrative condition in which the ToF photodiode blocks operate with very small (ideally zero) shuttle time (e.g., and very little accumulation of charge within the photodiode region 310). In practical implementations, the shuttle time is non-zero due to various factors, such as a tendency of charge to accumulate in (e.g., become trapped in) portions of the photodiode region 310 and/or to move slowly through the photodiode region 310. Further, the shuttle time may practically differ between the two taps of a ToF photodiode block due, for example, to slight asymmetries in the photodiode doping, and/or other process manufacturing variations. Various techniques can be used to seek to address the above idealities, such as by designing the ToF photodiode block so that the performance of the two readout taps is as symmetric as possible, so that the shuttle time is as small as possible (e.g., within a few nanoseconds), etc.

Shaded regions 435a of activation signal 320a-1 indicate the times when charge is accumulating in floating diffusion region 235a, and shaded regions 445a of activation signal 320b-1 indicate the times when charge is accumulating in floating diffusion region 235a. When there is such a small delay (e.g., on the order of five percent or less of the switching period), it can be seen that the overall timing of charge accumulation in the floating diffusion regions 235 accurately follows the timing of the reflected illumination signal waveform 420. As such, the relative amounts of charge that accumulate in the different floating diffusion regions 235 can accurately indicate the phase shift of the reflected illumination signal waveform 420, which corresponds to the roundtrip distance traveled by the photons of the illumination signal. The roundtrip distance can be used to triangulate the distance (e.g., depth) between the imaging system and whichever surface in the scene produced the reflected illumination signal waveform 420.

Conventional ToF pixels, such as the conventional ToF photodiode block 300 of FIG. 3, have various limitations, including that such conventional ToF pixels do not support charge binning. As described above, charge binning has been used with non-ToF imaging pixels to help increase dynamic range across a range of lighting conditions and/or to provide additional features. For example, imaging pixels can be arranged to share a floating diffusion node to support individual readout in high-illumination conditions and binned readout in low-illumination conditions. One reason that conventional ToF pixels do not support such charge binning is that conventional charge binning architectures are designed to share a single floating diffusion node among multiple pixels. As each ToF pixel has multiple readout taps at multiple floating diffusion nodes, such conventional charge binning architectures cannot be applied to ToF pixel arrays. Another reason that conventional ToF pixels do not support charge binning is that conventional ToF pixels integrate photocharge directly at their floating diffusion regions, and distance information is obtained from the ToF by comparing between the amounts of accumulated photocharge at the multiple floating diffusion regions. As such, sharing those floating diffusion regions with other ToF pixels in conventional architectures would frustrate, or even eliminate, the ability of the imaging sensor to obtain distance information from individual ToF pixels. Another reason that conventional ToF pixels do not support such charge binning is that conventional geometries of ToF pixels tend to be designed to facilitate efficient shuttling of photocarriers from a single photodiode region to multiple readout taps. Such geometries do not tend to support tiling layouts that facilitate sharing of floating diffusion regions.

Figure 5:
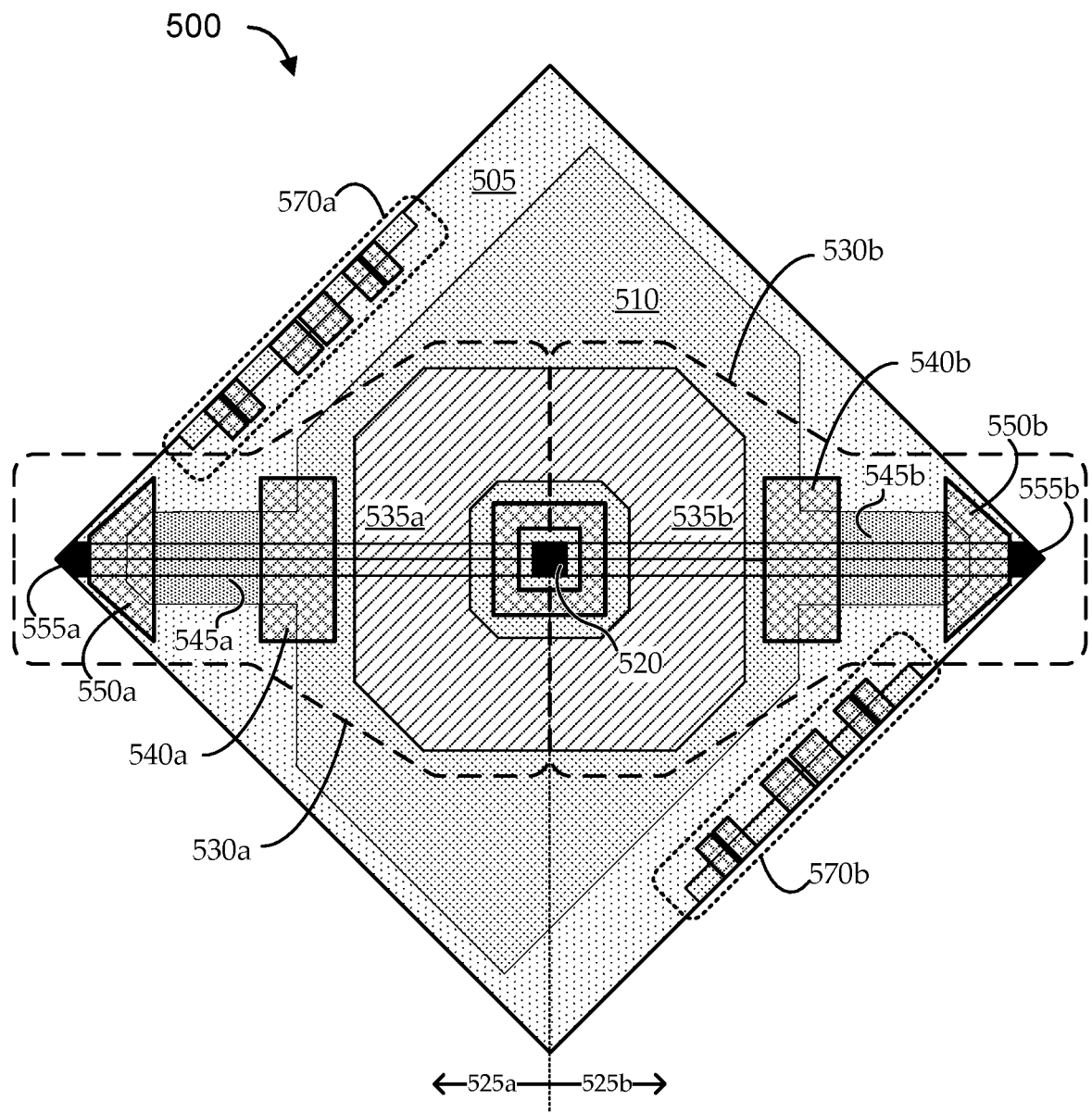
FIG. 5 shows a planar layout view of an illustrative implementations of a binnable ToF pixel, according to embodiments described herein.

Embodiments described herein include novel designs and arrangements of ToF pixels that support charge binning. FIG. 5 shows a planar layout view of an illustrative implementations of a binnable ToF pixel 500, according to embodiments described herein. The binnable ToF pixel 500 can be fabricated on a semiconductor substrate 505. For example, the semiconductor substrate 505 can be a silicon substrate designed for fabrication of complementary metal-oxide semiconductor (CMOS) devices. The semiconductor substrate 505 can include one or more oxide diffusion regions 510. For example, the oxide diffusion regions 510 can be regions of material having a first doping type, such as p-type silicon. References herein to structures formed on the semiconductor substrate 505, implanted into the semiconductor substrate 505, or the like are generally intended to include either the semiconductor substrate 505 itself and/or an oxide diffusion region 510 of the semiconductor substrate 505. For example, reference to a gate "formed on the semiconductor substrate 505" can include a gate formed on an oxide diffusion region 510, a gate that overlaps an oxide diffusion region 510 and other portions of the semiconductor substrate 505, etc.

As illustrated, the binnable ToF pixel 500 includes a dump gate 520 and two sub-pixels 530. Each sub-pixel 530 includes a respective photodiode region 535 (or portion of a photodiode region 540), a respective storage gate 540, a respective storage region 545, a respective transfer gate 550, and a respective floating diffusion region 555. Each floating diffusion region 555 corresponds to a "readout tap" of the binnable ToF pixel 500. Embodiments can also include one or more readout circuitry regions 570. Each such readout circuitry region 570 can include one or more transistors, or other devices formed on an oxide diffusion region separate from the oxide diffusion region 510 on which the ToF device is fabricated. For example, the readout circuitry regions 570 can implement the gain block 120, reset block 130, source-follower block 140, and/or select block 150 of FIG. 1.

Embodiments of the binnable ToF pixel 500 can be designed so that the first and second sub-pixels 530 are nominally symmetrical. As used herein, the term "nominal" (or "nominally") is intended to mean "as designed to be." A nominally defined characteristic, measurement, quantity, shape, etc. is as defined in accordance with a manufacturing and/or technical design specification, even though such a nominal definition cannot be precisely met in a practical manufacturing environment. For example, each sub-pixel 530 is designed to have identical doping profiles, geometries, etc. (i.e., as mirror images of each other); even though any practical implementation of the two sub-pixels 530 will not be precisely identical due to real-world manufacturing and/or other limitations.

The structures of each sub-pixel 530 are arranged in the planar layout generally along a vector 525 that points in a respective direction from a vertical centerline (e.g., corresponding to a center of the dump gate 520). In the illustrated implementation, the two vectors 525 point in opposite directions, such that the sub-pixels 530 are nominally mirror-symmetric about the vertical centerline. The illustrated implementation shows a single dump gate 520 lying on the axis of symmetry (the vertical centerline). The dump gate 520 is configured to drain all accumulated photocharge from the binnable ToF pixel 500 between integration and readout cycles. For example, the dump gate 520 drains all residual photocharge from the photodiode region 535 prior to integration. In some implementations, the dump gate 540 is coupled with a reset block, or the like. While a single dump gate 520 is shown, embodiments can include a dump gate 520 in each sub-pixel 530. In some such embodiments, both dump gates 520 are actuated together, so as to act as a single dump gate 520.

In the illustrated implementation, the photodiode region 535 is shown as a single (contiguous) region surrounding the dump gate 520. For example, the device is configured for backside illumination in the near-infrared portion of the optical spectrum. Photons interacting with the backside of the device are converted to photocarriers (e.g., electrons), which are attracted into the photodiode region 535. Because of the nominally symmetrical design of the photodiode region 535, it can generally be assumed that photocarriers are attracted in a substantially equivalent manner to either the side of the photodiode region 535. The photodiode region 535 can be designed in any suitable manner that produces such a substantially symmetrical attraction of photocarriers. For example, the photodiode region 535 can be implanted as a separate, non-contiguous photodiode region 535 in each of the sub-pixels 530. For the sake of convenient reference, each sub-pixel 530 is described herein as including a respective photodiode region 535, regardless of whether the photodiode region 535 is implemented as a single region (e.g., each sub-pixel 530 includes a respective portion of the single photodiode region 535), or as multiple regions (e.g., each sub-pixel 530 includes its own separate photodiode region 535). For example, the illustrated implementation shows a first photodiode region 535a in the first sub-pixel 530a, and a second photodiode region 535b in the second sub-pixel 530b.

Each sub-pixel 530 includes a respective storage region 545 and a respective floating diffusion region 555. Each of those regions is implanted into the semiconductor substrate 505 as a doped well of a doping type that is complementary to the doping of the semiconductor substrate 505 (or of the oxide diffusion region 510). For example, each doped well is a well of N-type doping material implanted into a P-type semiconductor substrate 505. Each of the doped wells of the storage regions 545, floating diffusion regions 555, and photodiode regions 535 is a nominally separate, non-overlapping well. Each sub-pixel 530 also includes a respective storage gate 540 and a respective transfer gate 550. In each sub-pixel 530, the respective storage gate 540 is formed on the semiconductor substrate 505 in a location that bridges the respective photodiode region 535 and the respective storage region 545. Similarly, in each sub-pixel 530, the respective transfer gate 550 is formed on the semiconductor substrate 505 in a location that bridges the respective storage region 545 and the respective floating diffusion region 555.

Actuation of any of the gates causes a current channel to form below the actuated gate. For example, actuation of the first storage gate 540a (i.e., the respective storage gate 540 of the first sub-pixel 530a) can cause a depletion region to form below the first storage gate 540a, which permits current to flow between the first photodiode region 535a and the first storage region 545a. The regions are doped to produce particular potential gradients so that formation of the current channel between the first photodiode region 535a and the first storage region 545a causes photocarriers in the first photodiode region 535a to be rapidly shuttled out to, and accumulated in the first storage region 545a. Similarly, actuation of the first transfer gate 550a can cause a depletion region to form below the first transfer gate 550a, which permits current to flow between the first storage region 545a and the first floating diffusion region 555a. The regions are doped to produce particular potential gradients so that formation of the current channel between the first storage region 545a and the first floating diffusion region 555a causes any photocarriers accumulated in the first storage region 545a to transferred out to the first floating diffusion region 555a (e.g., for readout). The gates and regions of the second sub-pixel 530b operate in a nominally identical manner.

Figure 6:
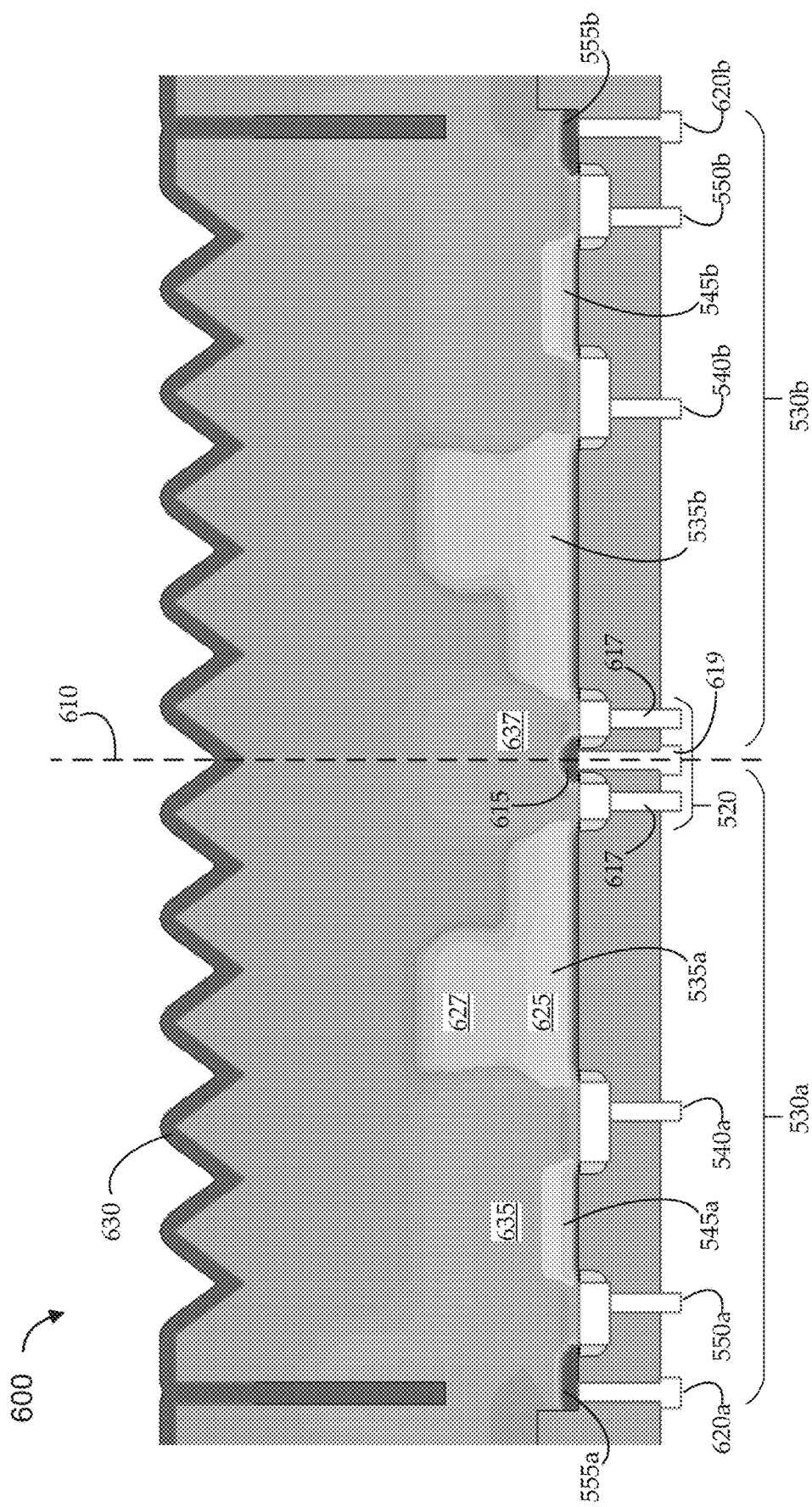
FIG. 6 shows an example cross-sectional view of an illustrative binnable ToF device, such as the device region (i.e., not including the readout circuitry) of the binnable ToF pixel of FIG. 5.

To illustrate additional features, FIG. 6 shows an example cross-sectional view 600 of an illustrative binnable ToF device, such as the device region (i.e., not including the readout circuitry) of the binnable ToF pixel 500 of FIG. 5. The colors are generally indicative of doping levels and doping types in different regions of the device following a typical optical spectrum order (i.e., from red to yellow to green to blue). The blue end of the color map indicates a highest net doping of the same doping type as the substrate (e.g., the magnitude of P-type doping), and the red end of the spectrum indicates a highest net doping of the doping type complementary to that of the substrate (e.g., the magnitude of N-type doping). As described herein, the binnable ToF device is nominally mirror-symmetric over an axis of symmetry 610 that passes through the dump gate 520, such that each side of the device is a sub-pixel 530. Each sub-pixel 530 includes a respective photodiode region 535, storage gate 540, storage region 545, transfer gate 550, and floating diffusion region 555. Each floating diffusion region 555 is also shown as having a coupled readout tap 620 for reading out the accumulated charge from the associated floating diffusion region 555. For example, readout circuitry is coupled with each floating diffusion region 555 via the corresponding readout tap 620, which can facilitate converting the amount of accumulated charge in the floating diffusion region 555 into a corresponding electrical signal (e.g., a voltage level, or the like).

As described with reference to FIG. 5, even though the two photodiode regions 535 appear in FIG. 6 to be separate, they may be implemented as a contiguous region surrounding the dump gate 520. The dump gate 520 is illustrated as including a heavily doped well 615 of material complementary to that of the substrate doping (e.g., the substrate is P-type, and the well 615 is N-type). The dump gate 520 is also illustrated as including a gate 617 on either side of a tap 619. For example, either or both gates 617 can be actuated to transfer any residual charge from the photodiode region 535 into the well 615, and the gate 619 can be used to drain the charge from the well 619.

The illustrated device is configured for backside illumination and enhanced for use in the near-infrared portion of the optical spectrum. For example, the backside of the device includes a charged oxide material layer 630 (e.g., halfnium oxide, or another suitable high-K material) that is patterned to scatter incoming photons. Scattering the photons tends to increase the path into the silicon substrate, which tends to enhance near-infrared response. Once the photons enter the silicon substrate as photocarriers (into a relatively neutrally doped region), they tend to diffuse into the substrate (e.g., as a random walk, etc.). As illustrated, the photodiode region 535 can be doped with a shallower medium-energy well and a deeper high-energy well. The deeper well can facilitate more efficient pulling of the photocarriers into the photodiode region 535. This provides for faster conversion from diffusion to drift movement of the photocarriers, which also helps facilitate faster shuttling of the photocarriers through the device. Fast and efficient shuttling of the carriers is further facilitated by optimizing doping of the storage region 545. As illustrated, the storage region 545 is relatively shallow (e.g., also a medium-energy-doped well), but with a higher doping than that of the medium-energy well of the photodiode region 535. For example, the medium-energy well of each photodiode region 535 is doped to approximately $2\times10^{12}$ cm$^{-2}$, and each storage region 545 is doped to approximately $1\times10^{13}$ cm$^{-2}$ (an dosage increase of approximately 110 keV).

As illustrated, some implementations include additional doping regions of the same type as the substrate (e.g., P-type doping). For example, doping region 635 can be optimized to isolate the photodiode region 535 from the storage region 545, to isolate the storage region 545 from the floating diffusion region 555, and to repel incoming photocarriers from the storage region 545 and the floating diffusion region 555 so that they move first into the photodiode region 535. Similarly, doping region 635 can be optimized to isolate the well 615 of the dump gate 520 from the adjacent photodiode regions 535 (or surrounding photodiode region 535).

Turning back to FIG. 5, during operation, the binnable ToF pixel 500 periodically alternates between integrating photocharge in its first sub-pixel 530a and integrating photocharge in its second sub-pixel 530b. Such alternating integration is referred to herein as "modulating" integration of photocharge in the two sub-pixels 530, or more concisely as "modulated integration." For example, an integration time window can be considered as including a series of modulation frames that alternate between first frames and second frames. In each first frame, the binnable ToF pixel 500 integrates photocharge in the first sub-pixel 530a; in each second frame, the binnable ToF pixel 500 integrates photocharge in the second sub-pixel 530b. In this way, the binnable ToF pixel 500 toggles back and forth between integrating photocharge in the two sub-pixels 530 over the integration time window.

In some implementations, the modulated integration (and the modulation frames of the integration time window) is synchronized with modulation of an illumination source. For example, an illumination source is pulsed on and off by a square wave having a 50-percent duty cycle and a modulation period, and the binnable ToF pixel 500 modulates integration of photocharge according to the same 50-percent duty cycle and modulation period. As described above (e.g., with reference to FIGS. 3 and 4), such synchronized modulation can result in photocharge being integrated by the two sub-pixels 530 in a proportion that corresponds to a round-trip time between a pulse of the illumination source and receipt of a reflection of that illumination pulse by the binnable ToF pixel 500. The round-trip time can correspond to a distance between the sensor system (including the illumination source and the binnable ToF pixel 500) and a surface in an imaged scene off of which the illumination pulse reflected.

Embodiments of the binnable ToF pixel 500 can operate in a "binned mode" or an "un-binned mode." In context of an array of such binnable ToF pixels 500, the un-binned mode facilitates individual readout of ToF information from each binnable ToF pixel 500 in the array. For example, the un-binned mode supports full-resolution readout of the array of binnable ToF pixels 500, such as for high-illumination conditions. In the un-binned mode, in each modulation frame of the integration time window, the binnable ToF pixel 500 can actuate the respective storage gate 540 of one of the sub-pixels 530, thereby shuttling photocarriers from the photodiode region 535 to the respective storage region 545 to accumulate photocharge in the respective storage region 545. When it is time to read out a particular binnable ToF pixel 500 in the array, the transfer gates 550 in both sub-pixels 530 can be actuated, thereby transferring the accumulated photocharge in each respective storage region 545 to the respective floating diffusion regions 555. The accumulated photocharge can then be read out of the floating diffusion regions 555.

The binned mode facilitates binned readout of ToF information from binning groups of binnable ToF pixels 500. For example, the binned mode supports reduced-resolution readout of the array of binnable ToF pixels 500, such as for low-illumination conditions. In each modulation frame of the integration time window, the binnable ToF pixel 500 can actuate both the respective storage gate 540 and the respective transfer gate 550 of one of the sub-pixels 530, thereby shuttling photocarriers from the photodiode region 535 directly to the respective floating diffusion region 555. As described more fully below, the binned mode assumes an array configuration in which the respective floating diffusion region 555 of each sub-pixel 530 of some or all binnable ToF pixels 500 is shared by a sub-pixel 530 of one or more other binnable ToF pixels 500, such that those sub-pixels 530 sharing a floating diffusion region 555 form a binning group in the array. When it is time to read out the binned value from a particular binning group, the associated shared floating diffusion region 555 already has an aggregate of accumulated photocharge from the sub-pixels 530 that are members of the binning group.

Figure 7:
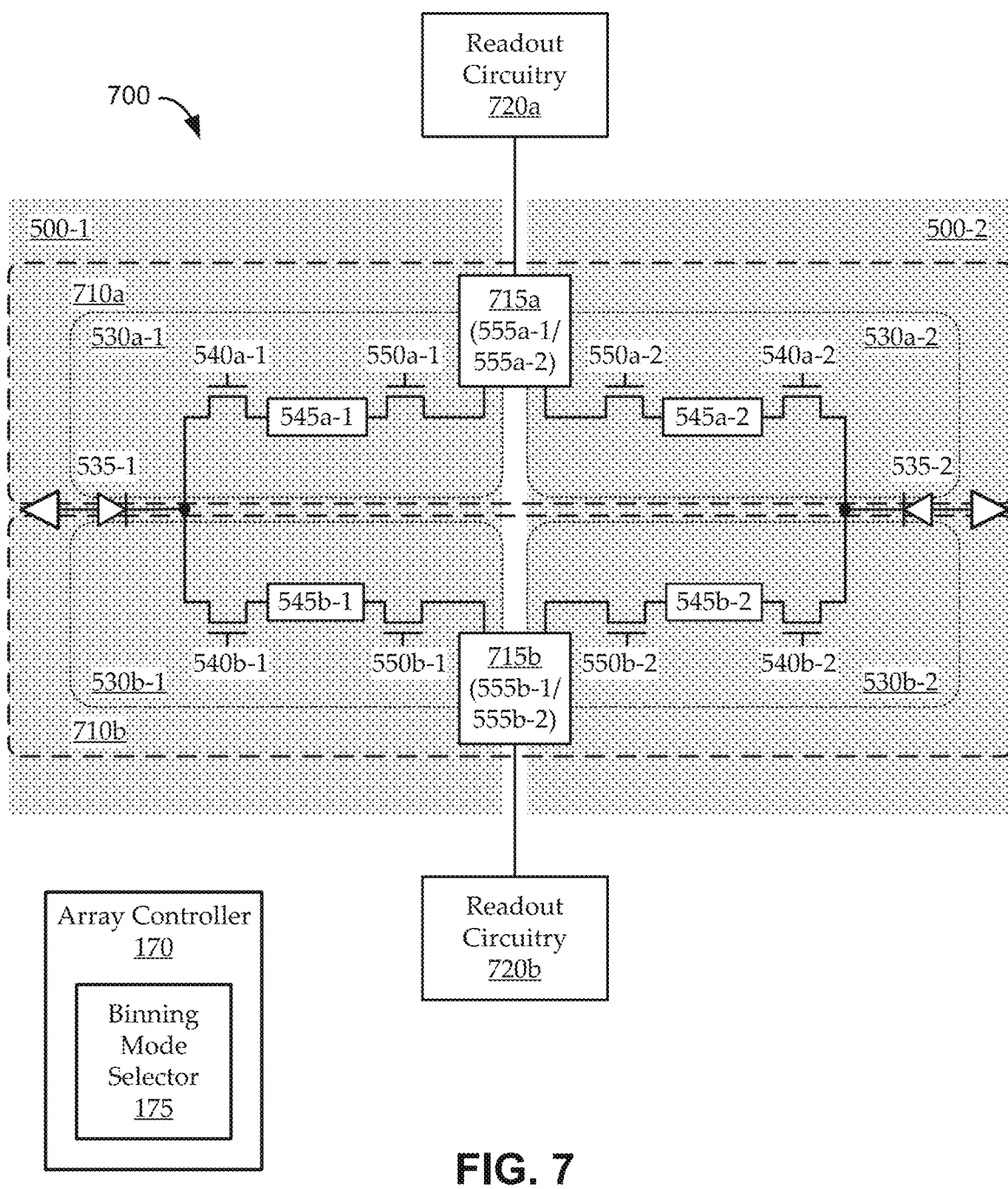
FIG. 7 shows a simplified schematic diagram 700 of two binnable ToF pixels configured into two binning groups.

For added clarity, FIG. 7 shows a simplified schematic diagram 700 of two binnable ToF pixels 500 configured into two binning groups 710. Each sub-pixel 530 is illustrated as a simplified circuit. Sub-pixel 530a-1 and sub-pixel 530b-1 are two sub-pixels 530 of a first binnable ToF pixel 500 having a common first photodiode region 535-1, and sub-pixel 530a-2 and sub-pixel 530b-2 are two sub-pixels 530 of a second binnable ToF pixel 500 having a common second photodiode region 535-2. Each sub-pixel 530 also includes a respective storage gate 540 and a respective transfer gate 550, each represented simply as a transistor; and also a respective storage region 545 represented simply as a block.

A first binning group 710a is associated with a first shared floating diffusion node 715a, and a second binning group 710b is associated with a second shared floating diffusion node 715b. The floating diffusion region 555a-1 of sub-pixel 530a-1 and the floating diffusion region 555a-2 of sub-pixel 530a-2 are both implemented by the first shared floating diffusion node 715a, such that sub-pixel 530a-1 and sub-pixel 530a-2 (a first of the sub-pixels 530 from each binnable ToF pixel 500) form, and are members of, the first binning group 710a. The floating diffusion region 555b-1 of sub-pixel 530b-1 and the floating diffusion region 555b-2 of sub-pixel 530b-2 are both implemented by the second shared floating diffusion node 715b, such that sub-pixel 530b-1 and sub-pixel 530b-2 (a second of the sub-pixels 530 from each binnable ToF pixel 500) form, and are members of, the second binning group 710b. The first shared floating diffusion node 715a is coupled with first readout circuitry 720a, and the second shared floating diffusion node 715b is coupled with second readout circuitry 720b.

As described above, the actuation states of the storage gates 540 and the transfer gates 550 can be controlled by an array controller 170 based on a binning mode set by a binning mode selector 175. For example, in an un-binned mode, each sub-pixel 530 of each binnable ToF pixel 500 can be separately read out, so that ToF-based distance information can be obtained from each binnable ToF pixel 500. For example, in each modulation frame of an integration time window, the array controller 170 alternates between (a) actuating storage gate 540a-1 and storage gate 540a-2 together, and (b) actuating storage gate 540b-1 and storage gate 540b-2 together. As such, at the end of the integration time window, photocharge has been accumulated in all of storage region 545a-1, storage region 545a-2, storage region 545b-1, and storage region 545b-2. For example, the ratio of accumulated charge in storage region 545a-1 to accumulated photocharge in storage region 545b-1 corresponds to a round-trip time for illumination pulses as detected by binnable ToF pixel 500-1; and the ratio of accumulated charge in storage region 545a-2 to accumulated photocharge in storage region 545b-2 corresponds to a round-trip time for the illumination pulses as detected by binnable ToF pixel 500-2.

In the un-binned mode, the accumulated photocharge in each storage region 545 can be read out individually by actuating the appropriate transfer gate 550 to transfer the charge to a corresponding one of the shared floating diffusion nodes 715, and using the coupled readout circuitry 720 to readout the transferred accumulated photocharge. For example, actuating transfer gate 550a-1 transfers any accumulated photocharge from storage region 545a-1 to floating diffusion region 555a-1, which also corresponds to shared floating diffusion node 715a; such that the transferred charge can be read out by readout circuitry 720a. For example, the pair of binnable ToF pixels 500 illustrated in FIG. 7 can be one of a large number of such pairs in an array. In the un-binned mode, a first ToF image can be generated by reading out all accumulated charge amounts from the first sub-pixel 530 of all binnable ToF pixels 500 in the array, and a second ToF image can be generated by reading out all accumulated charge amounts from the second sub-pixel 530 of all binnable ToF pixels 500 in the array. Each "pixel" of the first generated ToF image (i.e., each location having an associated read-out value in the image) can spatially correspond to a respective "pixel" in the second generated ToF image, such that distance information can be obtained by comparing the spatially corresponding values in the two images. For example, a depth map can be generated based on a comparison of the two ToF images, and the depth map can have up to the full resolution of the array of binnable ToF pixels 500.

In a binned mode, each binning group is charge binned at the associated shared floating diffusion node 715. For example, in each modulation frame of an integration time window, the array controller 170 alternates between (a) actuating storage gate 540a-1, storage gate 540a-2, transfer gate 550a-1, and transfer gate 550a-2 together; and (b) actuating storage gate 540b-1, storage gate 540b-2, transfer gate 550b-1, and transfer gate 550b-2 together. As such, at the end of the integration time window, photocharge has been accumulated in shared floating diffusion node 715a (corresponding to floating diffusion region 555a-1 and floating diffusion region 555a-2) and in shared floating diffusion node 715b (corresponding to floating diffusion region 555b-1 and floating diffusion region 555b-2). As such, the accumulated photocharge in shared floating diffusion node 715a is a charge-binned aggregate of the photocharge accumulated by both sub-pixel 530a-1 and sub-pixel 530a-2 (i.e., binning group 710a), and the accumulated photocharge in shared floating diffusion node 715b is a charge-binned aggregate of the photocharge accumulated by both sub-pixel 530b-1 and sub-pixel 530b-2 (i.e., binning group 710b). Further, the ratio of accumulated charge in shared floating diffusion node 715a to accumulated charge in shared floating diffusion node 715b corresponds to a round-trip time for illumination pulses as detected by a combination of binnable ToF pixel 500-1 and binnable ToF pixel 500-2.

In the binned mode, the accumulated photocharge in each shared floating diffusion node 715 can be read out by its coupled readout circuitry 720. For example, readout circuitry 720a can read out the binned accumulated photocharge at shared floating diffusion node 715a, and readout circuitry 720b can read out the binned accumulated photocharge at shared floating diffusion node 715b. For example, the pair of binnable ToF pixels 500 illustrated in FIG. 7 can be one of a large number of such pairs in an array. In the binned mode, a first ToF image can be generated by reading out all binned accumulated charge amounts from all first binning groups 710a (e.g., from all sub-pixels 530 of all binnable ToF pixels 500 in the array sharing a first floating diffusion region 555a), and a second ToF image can be generated by reading out all binned accumulated charge amounts from all second binning groups 710b (e.g., from all sub-pixels 530 of all binnable ToF pixels 500 in the array sharing a second floating diffusion region 555*b*). As in the un-binned mode, each "pixel" of the first generated ToF image (i.e., each location having an associated read-out value in the image) can spatially correspond to a respective "pixel" in the second generated ToF image, such that distance information can be obtained by comparing the spatially corresponding values in the two images. For example, a depth map can be generated based on a comparison of the two ToF images. However, unlike in the un-binned mode, the depth map in the binned mode has reduced resolution (as compared to the full resolution of the array of binnable ToF pixels 500) based on the amount of binning. For example, the illustrated example bins pairs of sub-pixels 530, thereby reducing the resolution by approximately a factor of two (the precise resolution reduction can depend on the configuration of the array, treatment of pixels at the edges of the array, etc.). Other implementations can bin the sub-pixels 530 in ways that yield other reductions in resolution, such as a reduction by a factor of four.

Figure 8:
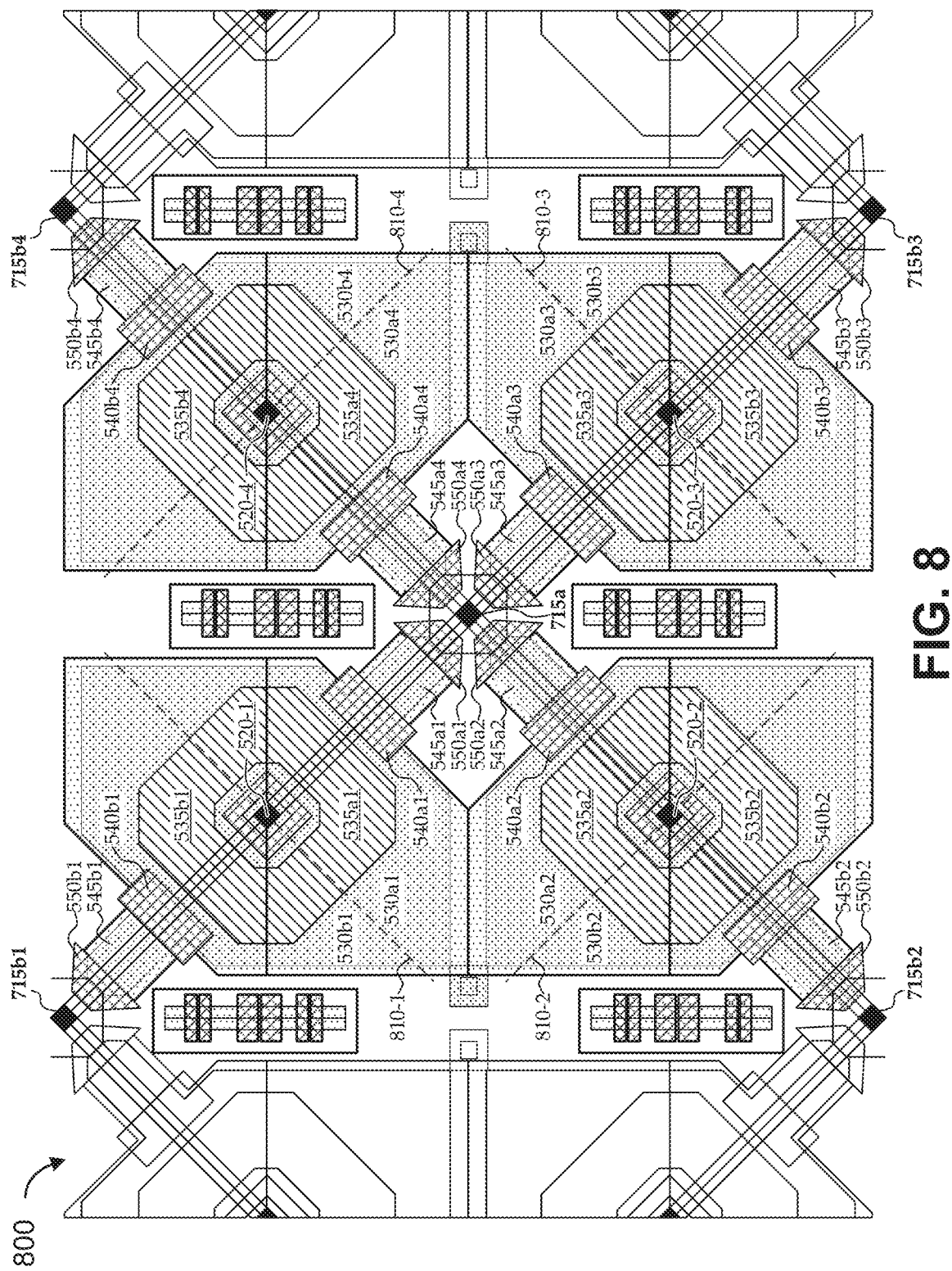
FIG. 8 shows an example planar layout of binnable ToF pixels to support up to 2-by-2 binning, according to various embodiments described herein.

FIG. 8 shows an example planar layout 800 of binnable ToF pixels to support up to 2-by-2 binning, according to various embodiments described herein. As illustrated, a number of instances of the binnable ToF pixel 500 of FIG. 5 are arranged diagonally. Each binnable ToF pixel 500 is illustrated as mirror-symmetric over a respective axis of symmetry 810 that passes through its respective dump gate 520, thereby defining a respective first sub-pixel 530*a* and a respective second sub-pixel 530*b* (indicated as first sub-pixels 530*a*1-530*a*4 and second sub-pixels 530*b*1-530*b*4). A group of four binnable ToF pixels 500 is illustrated (with shading), and additional, adjacent, partial representations of binnable ToF pixels 500 are shown for context. For example, the illustrated binnable ToF pixels 500 represent a portion of a large array of such pixels.

As illustrated, each of the shaded group of binnable ToF pixels 500 is oriented so that the respective first sub-pixels 530 all face inward. In this orientation, the floating diffusion region of each of the first sub-pixels 530 is implemented as a first shared floating diffusion node 715*a*. For example, actuation of any one or more of the first transfer gates 550*a*1-550*a*4 results in transferring of accumulated photocharge from a corresponding one or more of the first storage regions 545*a*1-545*a*2 to the first shared floating diffusion node 715*a*, where it can be read out. In such an arrangement, first sub-pixels 530*a*1-530*a*4 are members of a binning group that shares the first shared floating diffusion node 715*a*. In the illustrated arrangement, each of second sub-pixels 530*b*1-530*b*4 is a member of a respective binning group (each of those binning groups is only partially shown in FIG. 8) that is different from the binning group of its respective first sub-pixel 530*a*. In particular, second sub-pixel 530*b*1 is in a binning group around shared floating diffusion node 715*b*1, second sub-pixel 530*b*2 is in a binning group around shared floating diffusion node 715*b*2, second sub-pixel 530*b*3 is in a binning group around shared floating diffusion node 715*b*3, and second sub-pixel 530*b*4 is in a binning group around shared floating diffusion node 715*b*4. In some implementations of a large array of binnable ToF pixels 500, for each of every binnable ToF pixel 500 in the array, the first sub-pixel 530*a* is part of one binning group, and the second sub-pixel 530*b* is part of another binning group. In other implementations of a large array of binnable ToF pixels 500, some sub-pixels 530 are not part of any binning group. In some such implementations, for each of every binnable ToF pixel 500 in the array, at least one sub-pixel 530 (i.e., the first sub-pixel 530*a* and/or the second sub-pixel 530*b*) is a member of a binning group. For example, for binnable ToF pixels 500 around the edges of the array, whichever sub-pixel 530 is facing into the array (away from the edge) may be part of a binning group, while whichever sub-pixel 530 is facing away from the array (the edge-facing sub-pixel) may not be part of a binning group.

Because each binnable ToF pixel 500 is nominally symmetric, such that each of its sub-pixels 530 is nominally identical, reference to a particular sub-pixel 530 as the "first" or "second" sub-pixel 530 can indicate a modulation group associated with the sub-pixel 530. As described above, an integration time window can include a sequence of alternating first and second modulation frames. In each first modulation frame, integration is performed (e.g., as directed by an array controller 170) by all first sub-pixels 530*a* in the array; and in each second modulation frame, integration is performed (e.g., as directed by the array controller 170) by all second sub-pixels 530*b* in the array.

In the un-binned mode (as described above), each sub-pixel 530 of each binnable ToF pixel 500 can be read out individually. During integration, photocharge accumulation occurs in the storage regions 545 of the sub-pixels 530. At a readout time, a first ToF image can be generated by actuating transfer gates 550 in a sequence to individually transfer accumulated photocharge from each storage region 545 to a corresponding floating diffusion region 555 (i.e., implemented as one of the shared floating diffusion nodes 715), and reading out the transferred accumulated photocharge in the sequence from the corresponding shared floating diffusion node 715. In such a mode, each shared floating diffusion node 715 can be reset between each readout to ensure that each individual readout from a shared floating diffusion node 715 only includes accumulated photocharge from the storage region 545 of one of the sub-pixels 530 sharing that node. Some implementations can also use additional techniques, such as correlated double sampling (CDS), or the like, to further reduce any influence of noise (e.g., so-called "kTC" noise) or other sharing sub-pixels 530 on each individual readout. For example, each readout of a particular shared floating diffusion node 715 can include resetting the node (clearing the node of all accumulated photocharge from a previous transfer), reading out a first value to represent whatever residual charge and other charge due to noise that remains on the node, performing the transfer of accumulated photocharge to the node from the storage region 545 of one of the sharing sub-pixels 530, reading out a second value, and adjusting the second value based on the first value to normalize out any portion of the read-out photocharge that was not from the transfer. Other implementations use digital CDS, "3T mode" noise canceling, and/or any other suitable techniques to reset the shared floating diffusion node 715 prior to obtaining a measurement of transferred accumulated charge.

In the binned mode, the sub-pixels 530 sharing a particular shared floating diffusion node 715 integrate photocharge directly at the shared floating diffusion node 715 in aggregate. For example, as described above, whenever a sub-pixel 530 is accumulating photocharge in the binned mode, its storage gate 540 and transfer gate 550 can both be actuated so that photocarriers are shuttled directly from its photodiode region 535 to its shared floating diffusion node 715. When it is time for readout, the aggregated accumulated (charge-binned) photocharge can be read out from each shared floating diffusion node 715. In a large array of binnable ToF pixels 500, the illustrated arrangement will effectively result in an interlaced (e.g., checkerboard) pattern of first sub-pixel 530*a* binning groups and second sub-pixel 530b binning groups. During readout, a first ToF image can be formed by reading out the photodiode regions 535 of all first sub-pixel 530a binning groups, and a second ToF image can be formed by reading out the photodiode regions 535 of all second sub-pixel 530b binning groups. Because the binning groups are interlaced in the array, the formed first and second ToF images can represent interlaced ToF information. For example, if each binning group is considered as a super-pixel, each location in the second ToF image can be considered as shifted diagonally by a half-super-pixel from the corresponding location in the first ToF image. Generating distance information from the ToF images can involve accounting for the resulting spatial shift between the two ToF images. For example, when comparing the ToF images to obtain distance information (e.g., a depth map), each ToF image can be treated as having a reduced effective resolution based on the interlacing (e.g., reduced by a Kell factor, or the like).

Typically, the binned mode is used to bin all of the sub-pixels 530 (i.e., all four in the illustrated arrangement) sharing any particular shared floating diffusion node 715. In some cases, the binned mode can be configured to bin fewer than all of the sub-pixels 530 sharing a shared floating diffusion node 715. For example, some sub-pixels 530 can integrate photocharge directly on the shared floating diffusion node 715 for charge binning, while other sub-pixels coupled with the same shared floating diffusion node 715 can integrate photocharge in their respective storage regions 545 until it is time for an un-binned readout of that sub-pixel 530.

Figure 9:
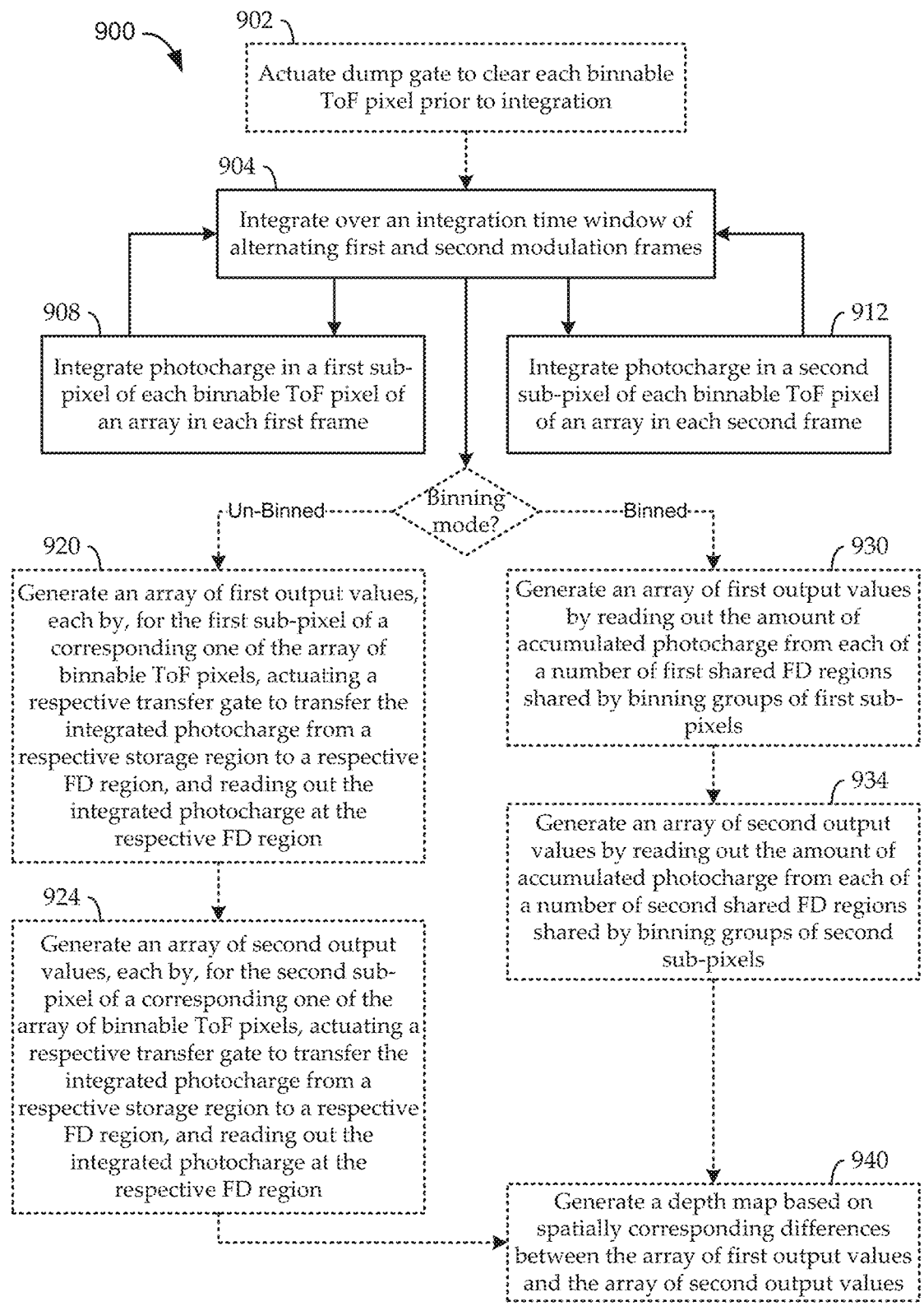
FIG. 9 shows a flow diagram of an illustrative method for ToF imaging sensing using binnable ToF pixels, according to embodiments described herein.

FIG. 9 shows a flow diagram of an illustrative method 900 for time-of-flight (ToF) imaging sensing using binnable ToF pixels, according to embodiments described herein. Embodiments of the method begin at stage 904 by integrating photocharge in binnable ToF devices over an integration time window. The integration time window includes a series of modulation frames that alternates between first frames and second frames. Each modulation frame is of a same frame duration defined based on modulation of an illumination signal. For example, an illumination signal is pulsed on and off at a particular rate, and the modulation frames are synchronized with the illumination pulses. In some embodiments, at stage 902, prior to the integration time window, the method 900 includes actuating the dump gate of each binnable ToF pixel prior to fully drain accumulated photocharge from the first sub-pixel and the second sub-pixel (e.g., from the PD regions).

In each of the first frames of the integration time window, at stage 908, embodiments can integrate photocharge in a first sub-pixel of each binnable ToF pixel of an array of binnable ToF pixels. In each of the second frames of the integration time window, at stage 912, embodiments can integrate photocharge in a second sub-pixel of each binnable ToF pixel of the array of binnable ToF pixels. For example, the method 900 iterates sequentially through stage 904, stage 908, stage 904, and stage 912 until the expiration of the integration time window. As described herein, each binnable ToF pixel can include a dump gate and first and second sub-pixels of each binnable ToF pixel being disposed on opposite sides of the dump gate (nominally mirror-symmetric over an axis of symmetry that passes through the dump gate). Each sub-pixel of each binnable ToF pixel includes a respective photodiode (PD) region adjacent to the dump gate, a respective floating diffusion (FD) region, a respective storage region between the respective PD region and the respective FD region, a respective storage gate formed between the respective PD region and the respective storage region, and a respective transfer gate formed between the respective storage region and the respective FD region.

For each binnable ToF pixel, the integrating photocharge in each of the first frames at stage 908 includes shuttling photocarriers from the respective PD region of the first sub-pixel to one of the respective storage region or the respective FD region of the first sub-pixel, depending on the binning mode. For each binnable ToF pixel, the integrating photocharge in each of the second frames at stage 912 includes shuttling photocarriers from the respective PD region of the second sub-pixel to one of the respective storage region or the respective FD region of the second sub-pixel, depending on the binning mode. In an un-binned mode, for each binnable ToF pixel, the integrating photocharge in each of the first frames at stage 908 includes shuttling photocarriers from the respective PD region of the first sub-pixel to the respective storage region of the first sub-pixel by actuating the respective storage gate of the first sub-pixel; and the integrating photocharge in each of the second frames at stage 912 includes shuttling photocarriers from the respective PD region of the second sub-pixel to the respective storage region of the second sub-pixel by actuating the respective storage gate of the second sub-pixel. In a binned mode, for each binnable ToF pixel, the integrating photocharge in each of the first frames at stage 908 includes shuttling photocarriers from the respective PD region of the first sub-pixel to the respective FD region of the first sub-pixel by actuating both the respective storage gate and the respective transfer gate of the first sub-pixel; and the integrating photocharge in each of the second frames at stage 912 includes shuttling photocarriers from the respective PD region of the second sub-pixel to the respective FD region of the second sub-pixel by actuating both the respective storage gate and the respective transfer gate of the second sub-pixel.

In some embodiments, subsequent to integration of photocharge in the binnable ToF pixels, the method 900 can read out the integrated photocharge in accordance with either the un-binned mode or the binned mode. In the un-binned mode, read out can proceed according to stages 920, 924, and 940. At stage 920, embodiments can generate an array of first sub-pixel output values, each by, for the first sub-pixel of a corresponding one of the array of binnable ToF pixels, actuating the respective transfer gate to transfer the integrated photocharge from the respective storage region to the respective FD region, and reading out the integrated photocharge at the respective FD region. At stage 924, embodiments can generate an array of second sub-pixel output values, each by, for the second sub-pixel of a corresponding one of the array of binnable ToF pixels, actuating the respective transfer gate to transfer the integrated photocharge from the respective storage region to the respective FD region, and reading out the integrated photocharge at the respective FD region. At stage 940, embodiments can generate a depth map based on spatially corresponding differences between the array of first sub-pixel output values and the array of second sub-pixel output values.

In the binned mode, read out can proceed according to stages 930, 934, and 940. As described above, the array of binnable ToF pixels can include a number of first shared FD regions (e.g., shared floating diffusion node 715a of FIG. 7) and a number of second shared FD regions (e.g., shared floating diffusion nodes 715b1-715b4 of FIG. 7). Each binnable ToF pixel is a member of one of a number of first binning groups and/or one of a number of second binning groups. For example, the first sub-pixel of each binnable ToF pixel is a member of a first binning group, and/or the second sub-pixel of each binnable ToF pixel is a member of a second binning group. For each first binning group, the respective FD regions of the first sub-pixels of the members of the first binning group are all a same respective one of the first shared FD regions, such that an amount of accumulated photocharge at each one of the first shared FD regions corresponds to a charge-binned aggregate of photocharge integrated by the first sub-pixels of the members of an associated one of the first binning groups. For each second binning group, the respective FD regions of the second sub-pixels of the members of the second binning group are all a same respective one of the second shared FD regions, such that an amount of accumulated photocharge at each one of the second shared FD regions corresponds to a charge-binned aggregate of photocharge integrated by the second sub-pixels of the members of an associated one of the second binning groups. At stage 930, embodiments can generate an array of first binned output values by reading out the amount of accumulated photocharge from each of the first shared FD regions. At stage 934, embodiments can generate an array of second binned output values by reading out the amount of accumulated photocharge from each of the second shared FD regions. At stage 940, embodiments can generate a depth map based on spatially corresponding differences between the array of first binned output values and the array of second binned output values.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them. It will be understood that, although the terms "first," "second," "third," etc. may be used herein to describe various elements, components, these elements, components, regions, should not be limited by these terms. These terms are only used to distinguish one element, component, from another element, component. Thus, a first element, component, discussed below could be termed a second element, component, without departing from the teachings of the present invention. As used herein, the terms "logic low," "low state," "low level," "logic low level," "low," or "0" are used interchangeably. The terms "logic high," "high state," "high level," "logic high level," "high," or "1" are used interchangeably.

As used herein, the terms "a", "an" and "the" may include singular and plural references. It will be further understood that the terms "comprising" "including", having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Furthermore, as used herein, the words "and/or" may refer to and encompass any possible combinations of one or more of the associated listed items.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

What is claimed is:

1. A binnable time-of-flight (ToF) pixel comprising:
a dump gate formed on a semiconductor substrate;
a first sub-pixel disposed on a first side of the dump gate and comprising:
   a first photodiode (PD) region, a first storage region, and a first floating diffusion (FD) region, each implanted into the substrate to form non-overlapping doped wells, the first PD region being closest to the dump gate, and the first FD region being farthest from the dump gate;
   a first storage gate formed on the substrate between the first PD region and the first storage region, such that actuation of the first storage gate forms a current channel between the first PD region and the first storage region; and
   a first transfer gate formed on the substrate between the first storage region and the first FD region, such that actuation of the first transfer gate forms a current channel between the first storage region and the first FD region;
a second sub-pixel disposed on a second side of the dump gate and comprising:
   a second PD region, a second storage region, and a second FD region, each implanted into the substrate to form non-overlapping doped wells, the second PD region being closest to the dump gate, and the second FD region being farthest from the dump gate;
   a second storage gate formed on the substrate between the second PD region and the second storage region, such that actuation of the second storage gate forms a current channel between the second PD region and the second storage region; and
   a second transfer gate formed on the substrate between the second storage region and the second FD region, such that actuation of the second transfer gate forms a current channel between the second storage region and the second FD region, and
readout circuitry coupled with the dump gate, the first FD region and the second FD region,
wherein the dump gate, the first sub-pixel, and the second sub-pixel are formed within a first oxide diffusion region formed on the substrate, and the readout circuitry is formed on at least a second oxide diffusion region formed on the substrate.

2. The binnable ToF pixel of claim 1, wherein:
the first storage gate and the first transfer gate lie along a first vector extending from the dump gate in a first direction; and the second storage gate and the second transfer gate lie along a second vector extending from the dump gate in a second direction opposite the first direction.

3. The binnable ToF pixel of claim 1, wherein:
the substrate is of a first doping type;
each of the first PD region and the second PD region is implanted into the substrate to comprise:
 a respective photodiode-defining well of a second doping type complementary to the first doping type and implanted to a first implant depth; and
 a respective pinning well heavily doped with material of the first doping type and implanted to second implant depth shallower than the first implant depth.

4. The binnable ToF pixel of claim 3, wherein:
each respective photodiode-defining well is implanted with a first doping energy;
each of the first storage region and the second storage region is implanted into the substrate to comprise a respective well of the second doping type at a second doping energy that is higher than the first doping energy; and
each of the first FD region and the second FD region is implanted into the substrate to comprise a respective well of the second doping type at a third doping energy that is higher than the second doping energy.

5. A time-of-flight (ToF) imaging sensor comprising:
an array of binnable ToF pixels, each comprising:
 a dump gate formed on a semiconductor substrate;
 first and second sub-pixels disposed on opposite sides of the dump gate, each comprising:
  a respective photodiode (PD) region, a respective storage region, and a respective floating diffusion (FD) region, each implanted into the substrate to form non-overlapping doped wells, each respective PD region being closest to the dump gate on its respective side, and each respective FD region being farthest from the dump gate on its respective side;
  a respective storage gate formed on the substrate between the respective PD region and the respective storage region; and
  a respective transfer gate formed on the substrate between the respective storage region and the respective FD region; and
an array controller configured to modulate integration of photocharge at the first and second sub-pixels synchronously with modulation of illumination to obtain ToF-based depth information from the array of binnable ToF pixels,
wherein in a binned mode, for each binnable ToF pixel, the array controller actuates the respective storage gate and the respective transfer gate of the first sub-pixel in each first frame, and the array controller actuates the respective storage gate and the respective transfer gate of the second sub-pixel in each second frame, thereby integrating photocharge in the respective FD regions of the first and second sub-pixels in a proportion corresponding to a round-trip time of the illumination as received by the binnable ToF pixel.

6. The ToF imaging sensor of claim 5, wherein the array controller is configured to modulate integration of photocharge at the first and second sub-pixels in accordance with a binning mode over an integration time window, such that:
the integration time window comprises a series of frames that alternates between first frames and second frames, each frame of a same frame duration defined based on the modulation of the illumination; and in an un-binned mode, for each binnable ToF pixel, the array controller actuates the respective storage gate of the first sub-pixel in each first frame, and the array controller actuates the respective storage gate of the second sub-pixel in each second frame, thereby integrating photocharge in the respective storage regions of the first and second sub-pixels in a proportion corresponding to a round-trip time of the illumination as received by the binnable ToF pixel.

7. The ToF imaging sensor of claim 6, wherein the array controller is further configured to obtain the ToF-based depth information from the array of binnable ToF pixels in the un-binned mode by:
generating an array of first sub-pixel output values, each by, for the first sub-pixel of a corresponding one of the array of binnable ToF pixels, actuating the respective transfer gate to transfer the integrated photocharge from the respective storage region to the respective FD region, and reading out the integrated photocharge at the respective FD region;
generating an array of second sub-pixel output values, each by, for the second sub-pixel of a corresponding one of the array of binnable ToF pixels, actuating the respective transfer gate to transfer the integrated photocharge from the respective storage region to the respective FD region, and reading out the integrated photocharge at the respective FD region; and
generating a depth map based on spatially corresponding differences between the array of first sub-pixel output values and the array of second sub-pixel output values.

8. The ToF imaging sensor of claim 5, wherein:
the array of binnable ToF pixels comprises a plurality of first shared FD regions, and a plurality of second shared FD regions;
each binnable ToF pixel is a member of one of a plurality of first binning groups and/or one of a plurality of second binning groups;
for each first binning group, the respective FD regions of the first sub-pixels of the members of the first binning group are all a same respective one of the first shared FD regions, such that an amount of accumulated photocharge at each one of the first shared FD regions corresponds to a charge-binned aggregate of photocharge integrated by the first sub-pixels of the members of an associated one of the first binning groups; and
for each second binning group, the respective FD regions of the second sub-pixels of the members of the second binning group are all a same respective one of the second shared FD regions, such that an amount of accumulated photocharge at each one of the second shared FD regions corresponds to a charge-binned aggregate of photocharge integrated by the second sub-pixels of the members of an associated one of the second binning groups.

9. The ToF imaging sensor of claim 8, wherein the array controller is further configured to obtain the ToF-based depth information from the array of binnable ToF pixels in a binned mode by:
generating an array of first binned output values by reading out the amount of accumulated photocharge from each of the plurality of first shared FD regions;
generating an array of second binned output values by reading out the amount of accumulated photocharge from each of the plurality of second shared FD regions; and generating a depth map based on spatially corresponding differences between the array of first binned output values and the array of second binned output values.

10. The ToF imaging sensor of claim 8, wherein each first binning group is a distinct 2-by-2 sub-array of the array of binnable ToF pixels defining four corner nodes and a central node, such that, for each first binning group, the center node corresponding to the respective one of the first shared FD regions shared by the respective FD regions of the first sub-pixels of the four members of the first binning group, and each of the four corner nodes corresponding to the respective FD region of the second sub-pixel of a respective one of the four members of the first binning group.

11. The ToF imaging sensor of claim 5, wherein:
the array controller is further configured to actuate the dump gate to fully drain accumulated photocharge from the first and second sub-pixels prior to modulating integration of photocharge.

12. The ToF imaging sensor of claim 5, wherein the illumination is near-infrared illumination.

13. A method for time-of-flight (ToF) imaging sensing, the method comprising:
over an integration time window comprising a series of frames that alternates between first frames and second frames, each frame of a same frame duration defined based on modulation of an illumination signal:
integrating photocharge in a first sub-pixel of each binnable ToF pixel of an array of binnable ToF pixels in each of the first frames; and
integrating photocharge in a second sub-pixel of each binnable ToF pixel of the array of binnable ToF pixels in each of the second frames,
wherein each binnable ToF pixel comprises a dump gate, the first and second sub-pixels of each binnable ToF pixel being disposed on opposite sides of the dump gate,
wherein each sub-pixel of each binnable ToF pixel comprises a respective photodiode (PD) region adjacent to the dump gate, a respective floating diffusion (FD) region, a respective storage region between the respective PD region and the respective FD region, a respective storage gate formed between the respective PD region and the respective storage region, and a respective transfer gate formed between the respective storage region and the respective FD region,
wherein, in a binned mode, for each binnable ToF pixel, the integrating photocharge in each of the first frames comprises shuttling photocarriers from the respective PD region of the first sub-pixel to the respective FD region of the first sub-pixel by actuating both the respective storage gate and the respective transfer gate of the first sub-pixel, and the integrating photocharge in each of the second frames comprises shuttling photocarriers from the respective PD region of the second sub-pixel to the respective FD region of the second sub-pixel by actuating both the respective storage gate and the respective transfer gate of the second sub-pixel.

14. The method of claim 13, wherein, in an un-binned mode, for each binnable ToF pixel:
the integrating photocharge in each of the first frames comprises shuttling photocarriers from the respective PD region of the first sub-pixel to the respective storage region of the first sub-pixel by actuating the respective storage gate of the first sub-pixel; and
the integrating photocharge in each of the second frames comprises shuttling photocarriers from the respective PD region of the second sub-pixel to the respective storage region of the second sub-pixel by actuating the respective storage gate of the second sub-pixel.

15. The method of claim 14, further comprising:
generating an array of first sub-pixel output values, each by, for the first sub-pixel of a corresponding one of the array of binnable ToF pixels, actuating the respective transfer gate to transfer the integrated photocharge from the respective storage region to the respective FD region, and reading out the integrated photocharge at the respective FD region;
generating an array of second sub-pixel output values, each by, for the second sub-pixel of a corresponding one of the array of binnable ToF pixels, actuating the respective transfer gate to transfer the integrated photocharge from the respective storage region to the respective FD region, and reading out the integrated photocharge at the respective FD region; and
generating a depth map based on spatially corresponding differences between the array of first sub-pixel output values and the array of second sub-pixel output values.

16. The method of claim 13, further comprising, for each binnable ToF pixel:
actuating the dump gate prior to the integration time window to fully drain accumulated photocharge from the first sub-pixel and the second sub-pixel.

17. The method of claim 13, wherein:
the array of binnable ToF pixels comprises a plurality of first shared FD regions, and a plurality of second shared FD regions;
each binnable ToF pixel is a member of one of a plurality of first binning groups and/or one of a plurality of second binning groups;
for each first binning group, the respective FD regions of the first sub-pixels of the members of the first binning group are all a same respective one of the first shared FD regions, such that an amount of accumulated photocharge at each one of the first shared FD regions corresponds to a charge-binned aggregate of photocharge integrated by the first sub-pixels of the members of an associated one of the first binning groups; and
for each second binning group, the respective FD regions of the second sub-pixels of the members of the second binning group are all a same respective one of the second shared FD regions, such that an amount of accumulated photocharge at each one of the second shared FD regions corresponds to a charge-binned aggregate of photocharge integrated by the second sub-pixels of the members of an associated one of the second binning groups.

18. The method of claim 17, further comprising:
generating an array of first binned output values by reading out the amount of accumulated photocharge from each of the plurality of first shared FD regions;
generating an array of second binned output values by reading out the amount of accumulated photocharge from each of the plurality of second shared FD regions; and
generating a depth map based on spatially corresponding differences between the array of first binned output values and the array of second binned output values.

* * * * *